United States Patent [19]
Takahashi et al.

[11] 3,920,946
[45] Nov. 18, 1975

[54] METHOD AND APPARATUS FOR AUTOMATIC WELDING OF STEEL PIPES

[75] Inventors: Chiyomaru Takahashi; Tadao Kaneko, both of Chiba; Akira Sakabe, Urawa; Mitsuhiro Sakagami; Kunio Arai, both of Funabashi, all of Japan

[73] Assignee: Hitachi, Ltd. and Kawasaki Steel Corporation, Japan

[22] Filed: Feb. 12, 1974

[21] Appl. No.: 441,898

[30] Foreign Application Priority Data
Feb. 21, 1973  Japan.............................. 48-20162

[52] U.S. Cl................. 219/60 A; 219/126; 228/29; 228/45
[51] Int. Cl............................................. B23k 9/00
[58] Field of Search ............ 219/60 A, 126; 228/29, 228/45

[56] References Cited
UNITED STATES PATENTS

| | | |
|---|---|---|
| 2,598,076 | 5/1952 | Smith............................ 219/60 A X |
| 3,196,245 | 7/1965 | Nelson et al...................... 219/60 A |
| 3,678,239 | 7/1972 | Hill.................................. 219/60 A |
| 3,783,223 | 1/1974 | Gwin et al. ........................ 219/60 A |
| 3,805,011 | 4/1974 | Knaefel et al...................... 219/60 A |
| 3,840,170 | 10/1974 | Arikawa et al. .............. 219/60 A X |

*Primary Examiner*—J. V. Truhe
*Assistant Examiner*—N. D. Herkamp
*Attorney, Agent, or Firm*—Craig & Antonelli

[57] ABSTRACT

A novel method for efficiently and automatically welding abutted ends of a pair of steel pipes placed one upon another, end to end, and an apparatus adapted for practicing the method. Magnetic rollers of a self-driven carriage carrying a welding torch are kept, by magnetic attraction, in contact with the circumferential surface of a support band, which in turn is fitted around the upper pipe of the pair and properly positioned relative to the welding zone by means of a plurality of tabs spaced apart and fixed to the pipe. The carriage is guided by the support band and travels around the pipe to accomplish the welding.

10 Claims, 12 Drawing Figures

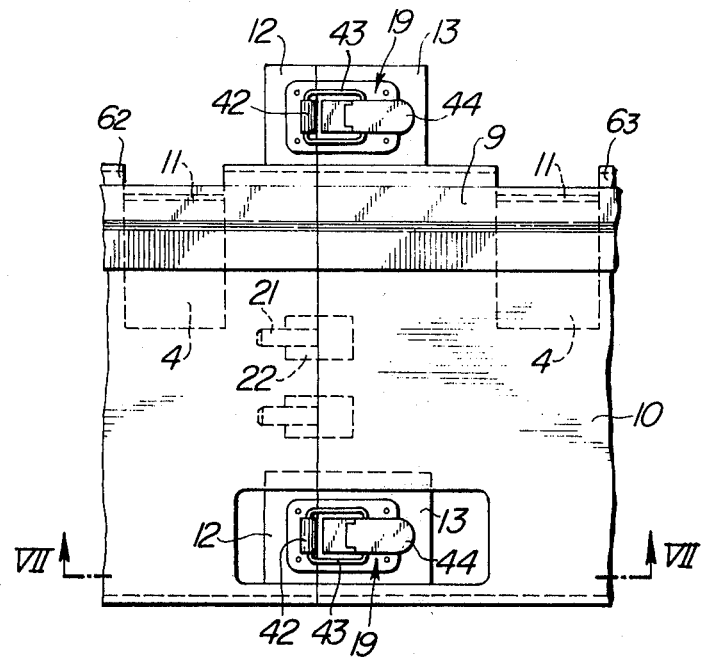
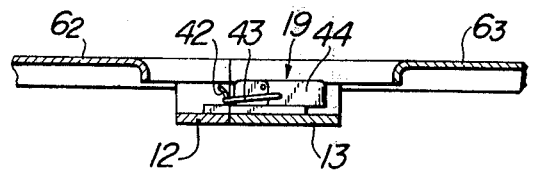

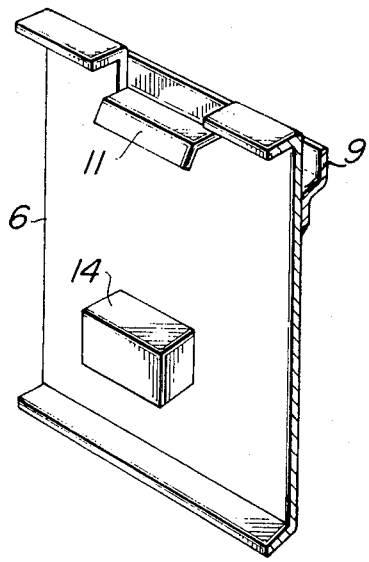
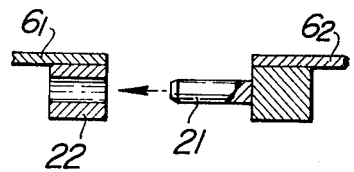
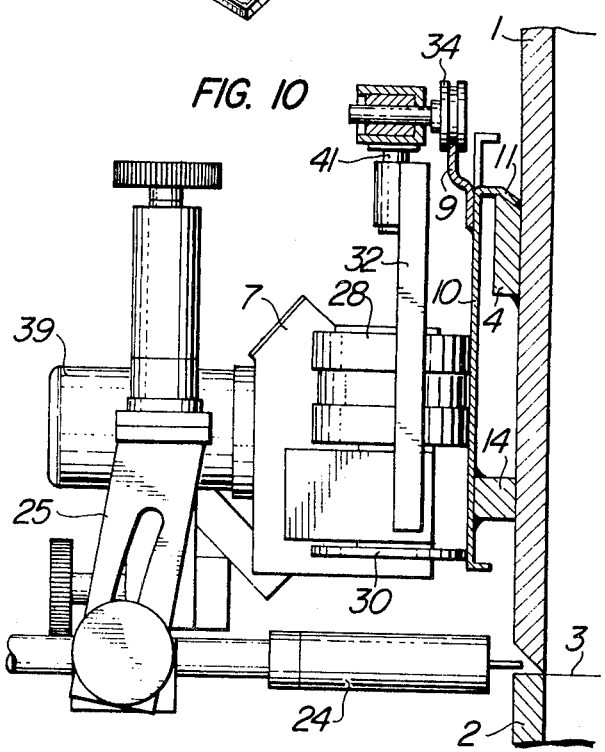

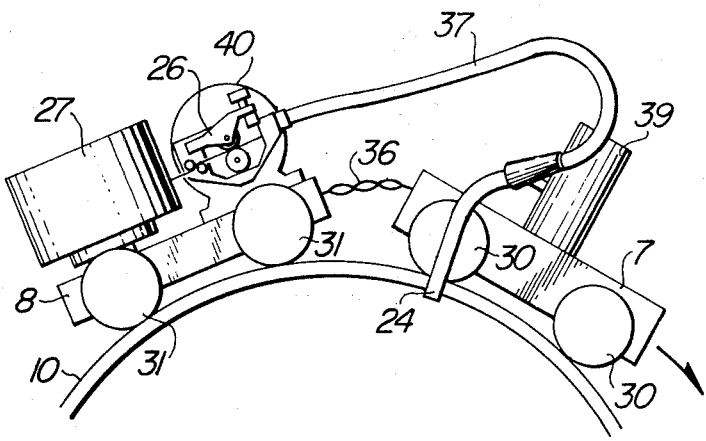
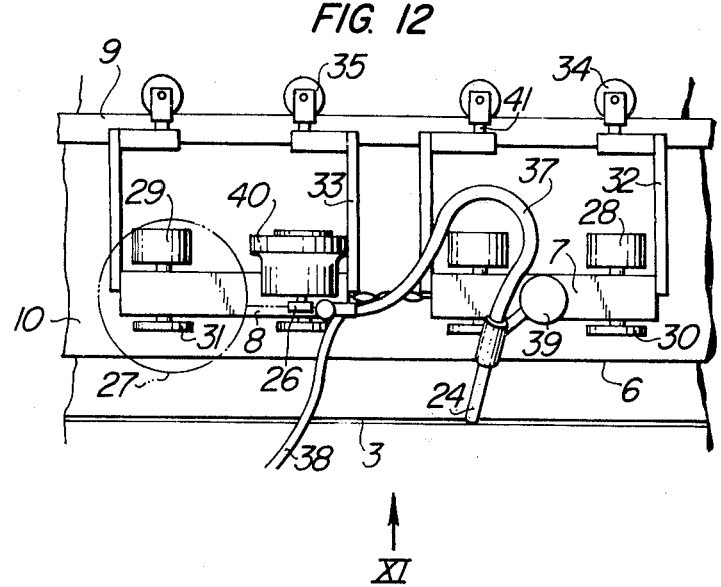

METHOD AND APPARATUS FOR AUTOMATIC WELDING OF STEEL PIPES

This invention relates to a method and an apparatus for automatic welding best suited for the lateral butt welding of steel pipes having welded means of their own, such as steel pipes of relatively large diameters, particularly spirally welded pipes, for use as foundation piles or other supporting units for structures.

In foundation work using steel pipe piles, a customary practice is to drive the pipes into the ground one upon another, and weld them end upon end, until the pipes so jointed single pile are driven down to a desired depth. Similarly, it is often case with the construction work employing steel pipe columns that the pipes are jointed endwise with the progress upward of the construction.

For endwise connection of the steel pipe piles or columns, are welding is widely used. In recent years attempts have been made to fully automate the process in order to save labor and produce homogeneous welds. However, the techniques thus far developed for the automatic welding of steel pipes for such applications have several drawbacks; none have provided satisfaction as yet both in workability or reliability.

In fully automated lateral butt welding of such steel pipes it is essential for obtaining homogeneous welds that the welding torch be moved at a constant velocity while maintaining the same position relative to the welding zone. Moreover, for labor-saving purposes, the apparatus to be employed should be as lightweight and easily mountable on or demountable from the work as possible.

Typical prior art methods are as follows:

1. A method in which a support band of a split type equipped with a guide rail and a ring gear is temporarily hooped on the surface portion of a steel pipe in the vicinity of the welding zone between the pipe end and the abutted one, concentrically with the pipe. A carriage carrying a welding torch is suspended from the guide rail, and a gear driven by a motor on the carriage is engaged with the ring gear to move the carriage around the pipe.

2. A method in which a carriage equipped with magnetic rollers is used. The rollers are in direct contact, by magnetic attraction, with the outer surface of a steel pipe in the vicinity of the welding zone between the pipe and the abutted one. The rollers on one side of the carriage are suspended by a guide rail welded to the pipe wall and are driven by a motor on the carriage, so that the carriage travels circumferentially around the pipe.

The method (1) is disadvantageous because the support band carrying the ring gear is too heavy for handling, because the ring gear is usually formed by machining from thick steel material the centering of the support band to the pipe to be hooped thereby requires great technical skill, and the support band tends to slip down under the burden of the carriage and thus bring the welding torch out of its proper working position with respect to the welding zone during the course of welding, due to the fact that the mounting of the band relies simply upon the force of friction between the pipe surface and the ends of adjusting bolts.

The method (2) is of advantage over the former in the facility of operation (workability). However, when applied to the lateral butt welding of steel pipes having welded seams, such as spirally welded pipes, the relative positions of the welding torch and welded zone may be made irregular by the vibration of the carriage due to the rocking of the magnet rollers crossing the seam in the form of a rib on the pipe surface. This provides undesirable effects on the resultant weld. Also, in the case where seamless steel pipes are to be butt welded, any deposit of rust, mud or other foreign matter on the surface can make the pipes less attractive to the magnetic rollers and cause the rollers under the weight of the carriage to rise above the guide rail, thus forcing the welding torch out of its proper positional relation to the welding zone. These possibilities have made the method (2) questionable with respect to reliability in the welding operation.

The present invention has for its object the provision of a method and an apparatus for automatically lateral butt welding steel pipes for pile foundation or as steel columns for construction work, capable of eliminating the foregoing disadvantages of the prior art methods and achieving a weld with a high degree of workability and reliability.

The above and other objects, features and advantages of the present invention will become apparent from the following description taken in conjunction with the accompanying drawings, in which:

FIG. 4 is a front view showing another joint of the support band;

FIG. 7 is a sectional view taken on line VII—VII of FIG. 4;

FIG. 8 is a fragmentary sectional view of a joint of the support band in an open state;

FIG. 9 is a perspective view of part of the support band as seen from the inside;

FIG. 10 is a side view, partly in section, of the apparatus according to the invention as installed for a welding operation;

FIG. 11 is a view of the apparatus as seen from the direction of an arrow XI in FIG. 12; and FIG. 12 is a front view of the apparatus shown in FIG. 10.

Figure 1:
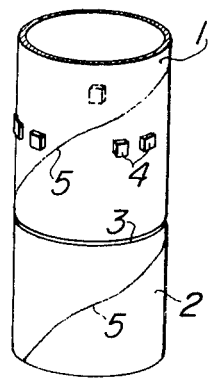
FIG. 1 is a perspective view of steel pipes for a pile foundation placed vertically one upon another, end to end, to be welded in accordance with the present invention.
Figure 2:
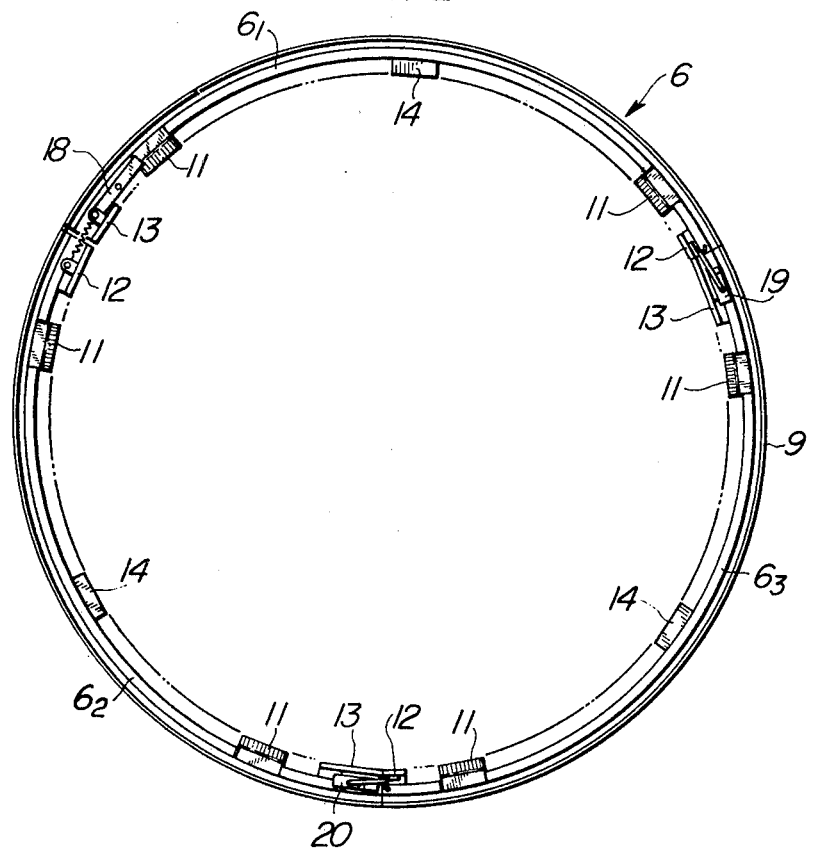
FIG. 2 is a plan view of a support band for use in the invention.
Figure 5:
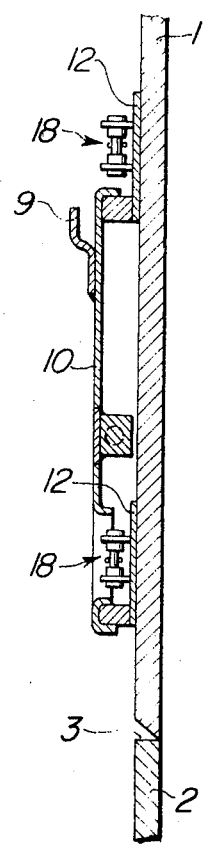
FIG. 5 is a sectional view taken on line V—V of FIG. 3.
Figure 3:
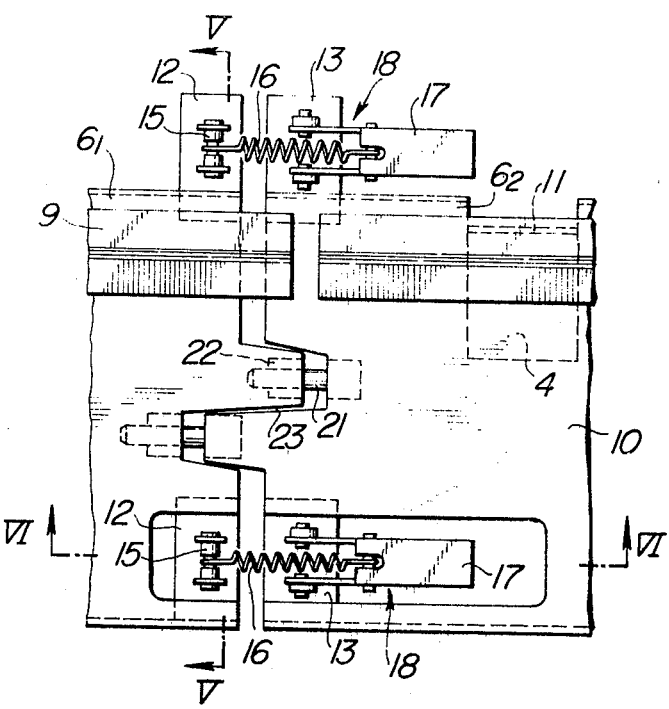
FIG. 3 is a front view showing one of the joints of the support band.
Figure 6:
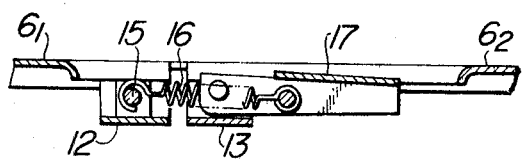
FIG. 6 is a sectional view taken on line VI—VI of FIG. 3.

Referring now to FIG. 1 there are shown two steel pipes 1, 2 used for piling placed one upon another, end to end, to be lateral butt welded. The upper pipe 1 has engaging tabs 4 secured to several points of its outer surface, equidistantly from the lower end or welding zone 3. These tabs 4 are formed by bending a strip of steel to the pipe contour, cutting the curved strip into pieces, and then welding them to appropriate points of the pipe. They may be welded to the pipe surface during the manufacture of the pipes at factory. Numeral 5 indicates a seam formed when each pipe was fabricated by spirally bending a strip and welding edge to edge. The vicinity of the seam 5 where the strip edges are united together somewhat bulges outward from the rest of the pipe surface. Such a welded seam can present a major obstacle in the path of a welding carriage which must travel along the circumference of the pipe.

In order to eliminate this obstacle, the welding apparatus according to the present invention uses a support band 6 and welding carriages 7, 8 of special designs as illustrated in FIGS. 2 through 12.

The support band 6, which serves to support the carriages and guide them along the welding zone, consists of a hoop divided, depending on the diameter of the pipes to be welded, into two, three or more segments or arcuate blocks disconnectably jointed together to facilitate the mounting and demounting. The weight of each arcuate block is desirably such that it can be conveniently carried and otherwise handled by an operator, so that the support band may be assembled or disassembled on the pipe in the piling position. FIGS. 2 to 9 show an example of a support band composed of three arcuate blocks $6_1$, $6_2$, $6_3$ of steel. The support band comprises an annular guide rail 9 and a cylindrical track 10 underlying and extending downward from the guide rail. As ancillary parts, each arcuate block has on its upper edge several hook pawls 11 for engagement with the tabs 4 on the outer wall of the pipe, and is also provided with positioning feet 12, 13, 14 extended to an equal length from several points, i.e., the both circumferential ends and a few points in between, of each arcuate block toward the pipe surface.

The pawls 11 may be formed by partly slitting the upper edge of the steel strip constituting the main body of each arcuate block and bending the slitted portions inwardly or, alternatively, by welding separate pawl-shaped pieces to the main body. In either case it is desirable, as noted above, that the pawls be provided at least on the both circumferential ends and at a few points in between of each block.

As means for detachably connecting the arcuate blocks into an endless band and holding the same in a given position around the pipe, there are provided a vertical pair of fasteners 18 between the blocks $6_1$ and $6_2$, each fastener comprising a pin 15, a hook spring 16, and a lever 17. At the other boundaries, i.e., between the blocks $6_1$ and $6_3$ and between the blocks $6_2$ and $6_3$, there are vertical pairs of connectors 19 and 20, each comprising a catch 42, a spring-loaded ring 43, and a lever 44. The positioning feet 12, 13 at the circumferential ends of the arcuate blocks also serve as mounting bases for these fasteners and connectors. As auxiliary connecting means to keep the ends of the arcuate blocks abutted in register, the circumferential end of one of the blocks is provided with pins 21 projecting outwardly, and the other end of the block with tubular members 22 for receiving the pins. These fasteners 18 and connectors 19, 20 are located close to the steel pipe and away from the cylindrical track 10 lest they should obstruct the travel of the welding carriages 7, 8. The pins 21 and the tubular members 22 for receiving the pins are mounted on the rear side of the track. (See FIGS. 3, 6 and 7.) Between the arcuate blocks $6_1$ and $6_2$ is provided a sufficient interference to make up for the dimensional error or discrepancy between the circumference of the steel pipe and the length of the band. Also, in order to form a continuous, endless track, the joint or boundary 23 between the two blocks is made zigzag. (FIG. 3) Desirably the support band is surface treated, for example by plating, to prevent rusting.

The support band 6, fabricated in the manner described, is applied around the steep pipe by holding the component blocks, one after another, in engagement with the tabs 4 as illustrated in FIG. 10. The blocks held end to end are connected by the connectors 19, 20. Lastly, the remaining boundary 23 is bridged across by the hook springs 16 extended from the levers 17 on the block $6_2$ and hooked up to the pins 15 on the adjacent block $6_1$. The levers 17 are then turned down to the laying position so that the band as a whole is clamped, by virtue of the hook springs, around the steel pipe. At this point, care is taken to set the feet 12, 13, 14 of the band in proper contact with the normal outer wall surface of the pipe and not in the vicinity of the welded seam 5. This enables the guide rail 9 of the band and the cylindrical track 10 to be positioned in exactly concentrical relations to the circumference of the pipe.

As shown, the upper ends of the tabs 4 are sloped with decreasing height toward the pipe wall and are thus adapted to engage the pawls 11 to keep the individual blocks suspended around the pipe until they are clamped together to form a continuous, endless band.

Following the mounting of the support band, the carriages for the welding implements are set on the band in the way as represented in FIGS. 10 to 12. The embodiment shown has two welding carriages; one is a self-driven carriage 7 equipped with motive power and the other is a driven carriage 8. On the self-driven carriage 7 is mounted a torch-holding mechanism 25 of a well-known structure that supports a welding torch 24 and is capable of adjusting the posture and angle of the torch so as to direct it upward or downward, or to the right or left. The driven carriage 8 carries an electrode-wire feeder 26 and a wire reel 27. In this way each carriage is made lighter in weight than when a single carriage carries the torch and all its ancillaries, and therefore the carriages can be set in position with greater ease. In applications where the electrode wire may be fed over much longer distances, it is possible to install the feeder and reel on the ground.

Each carriage has magnetic rollers 28 or 29, auxiliary rollers 30 or 31, and guide rollers 34 or 35, each in a pair of leading and trailing ones. The magnet roller 28, 29 and auxiliary rollers 30, 31 are mounted on common axles, whereas the guide rollers 34, 35 are supported by arms 32, 33 extended upward from the both ends of the carriages in such a manner that the center axes of the guide rollers are substantially perpendicular to those of the magnetic rollers 28, 29.

The magnetic rollers 28, 29 contain powerful permanent magnets and roll, over and are magnetically attracted to the track, as for example described in the U.S. Pat. specification 3,764,777. The auxiliary rollers 30, 31, in the form of simple non-magnetic discs, serve to cooperate with the magnetic rollers 28, 29 and support the carriages movably on the track. Although the embodiment being described uses magnetic rollers only on one side of the carriages, the auxiliary rollers may be replaced by extra magnetic rollers where necessary.

The common axles for the magnetic rollers 28 and auxiliary rollers 30 are connected to the drive motor 39 on the carriage 7 via reduction gearing (not shown) and are thereby positively driven.

With the carriages set in position, the guide rollers 34, 35 ride, with their inner peripheral grooves, on the guide rail 9 suspending the carriages securely. As a consequence, the magnetic rollers 28, 29 and auxiliary rollers 30, 31 are held in contact with the cylindrical track 10 of the support band. In this state the two carriages 7, 8 are coupled to each other by a length of disconnectable chain 36. The torch 24 at the free end of a wire feed pipe 37 is mounted on the self-driven carriage 7 and is properly positioned on the welding zone.

The power unit of the electrode-wire feeder 26 is connected to a welding power source on the ground via a power cable 38, whereby the welding power is supplied through the cable to the torch by way of a conductor in the wire feed pipe 37. Other details, such as auxiliary cables for power supply to the carriage drive motor 39 and to the motor 40 of the wire feeder, shielding gas hose, etc., are omitted for the simplicity of illustration.

The preparation for welding being over, the apparatus is now operated in the following way. Turning on the power source enables the motor 39 to drive the magnetic rollers 28 held in contact with the cylindrical track 10 by magnetic attraction. Consequently, the self-driven carriage 7 and the towed carriage 8 travel together along the welding zone around the abutted ends of the steel pipes guided by the guide rail 9. At the same time, an arc is continuously produced between the base metal and the tip of the wire being fed from the wire reel 27 to the torch 24. The abutted ends of the pipes are thus automatically welded together.

As shown the guide rollers 34, 35 are mounted in position turnably with their supporting spindles 41 relative to the arms 32, 33, the spindles 41 being aligned to the extensions of center axes of the magnet rollers 28, 29. This arrangement permits the carriages to be used in the welding of pipes having many different diameters, provided that the directions of the guide rollers 34, 35 are simply changed to meet the particular size of the pipes to be welded together.

The present invention has the following advantages over the prior art:

1. The absence of any ring gear contributes to the reduction in weight of the support band. Also, there is no need of cumbersome adjustment in the centering of the band to the circumference of the steel pipe. The support band is, therefore, easy to mount and demount.

2. Because the support band is hooked up to the tabs on the pipe and is thereby positioned and enabled to suspend the carriages on its guide rail, there is absolutely no possibility of the welding torch being deviated from its proper position relative to the welding zone therebelow. Moreover, the magnetic rollers of the carriages, by their magnetic attraction, on the cylindrical track of the support band, which in turn is held in contact with the normal outer wall surface of the pipe excepting the vicinity of its welded seam, are kept in a propr concentric relation to the circumference of the pipe. This keeps the torch in a constant horizontal position relative to the welding zone and renders it possible for the carriages to travel at a constant speed without slipping over the track. These features combine to make possible highly reliable, good-quality welding.

3. Once the support band is cleared of rust and mud, the welding will be smoothly accomplished irrespective of some deposition of such foreign matter on the pipe.

4. The tabs on the pipe, which can be attached during the fabrication of the pipe at the factory, involve no additional labor at the site.

While the method of the invention is best suited, as has been described above, for the lateral butt welding of steel pipes having welded seams for use in pile foundations, it should be understood, of course, that the afore-described method and apparatus of the invention are equally applicable to the lateral butt welding of seamless steel tubes and, further, of steel pipes for use as columns in construction work.

We claim:

1. A method for automatic welding at a welding zone defined by abutted ends of a pair of steel pipes held vertically one upon the other, end to end, by the use of a self-driven carriage equipped with magnetic rollers, drives for driving the rollers, and guide rollers having center axes substantially perpendicular to those of the magnetic rollers, comprising the steps of:

hooping the upper one of the pipes with a releasable support band composed of an annular guide rail and a cylindrical track suspended from the rail, and properly positioning the band relative to the welding zone by hooking the same on tabs secured beforehand to several points of the outer wall surface of the pipe which are at equal distances from the welding zone, clamping the support band to keep it in contact with the normal wall surface of the pipe at several points spaced apart circumferentially of the pipe, suspending the afore-mentioned carriage from the guide rail of the support band by means of the guide rollers, with the magnetic rollers of the carriage in contact with the cylindrical track of the suppport band by magnetic attraction, setting a welding torch on the carriage, with its nozzle tip directed to the welding zone, and driving the magnetic rollers so that the carriage travels with the torch thereon along the welding zone to accomplish welding.

2. A method according to claim 1, further comprising the steps of securing tabs at several points of the outer wall surface of the pipe which tabs are at equal distances from the welding zone.

3. An apparatus for automatic welding at a welding zone defined by abutted ends of a pair of steel pipes held vertically one upon the other, end to end, comprising:

tabs secured to several points of the upper pipe at equal distances from the welding zone, a releasable support band composed of an annular guide rail and a cylindrical track suspended from the rail, and provided with hook pawls extended from the upper edge of the track for engagement with the upper ends of the tabs, and also having feet extended to an equal length from several points spaced apart circumferentially toward the outer wall of the pipe, means for clamping the support band to keep its feet in contact with the normal outer surface of the pipe, a self-driven carriage equipped with magnetic rollers which roll in contact, by magnetic attraction, with the cylindrical track of the support band, drives for causing the magnetic rollers to run, and guide rollers engaged with the guide rail of the support band to suspend the carriage from the rail, said carriage being thus adapted to travel over the support band and along the welding zone, and a welding torch mounted on said carriage.

4. An automatic welding apparatus as claimed in claim 3, wherein the upper ends of the tabs are sloped with decreasing height toward the pipe, and the pawls of the support band are so shaped as to fit in close contact with the contours of said upper ends of the tabs.

5. An automatic welding apparatus as claimed in claim 3, wherein the support band is divided into a plurality of segments or arcuate blocks, each block having the pawls extended along the upper ends of the tabs and the plural feet spaced apart circumferentially of the pipe and extended to an equal length toward the pipe surface, and at least one of the boundaries between these blocks is provided with clamp means for fastening the support band, as a whole, to the outer surface of the pipe, while the other boundaries are provided with disengageable connector means.

6. An automatic welding apparatus as claimed in claim 5, wherein at least one of the boundaries between the support band blocks is made zigzag across the track so that a continuous, endless track can be provided circumferentially of the pipe, and the block ends to form each joint have a pin on one end and a tubular member for receiving the pin on the other end.

7. An automatic welding apparatus as claimed in claim 4, wherein the clamp means and connector means are located at points close to the steel pipe surface away from the cylindrical track and the mounting bases for such means serve also as positioning feet for the fitting of the arcuate blocks of the support band.

8. An automatic welding apparatus as claimed in claim 3, which further comprises a driven carriage and means for disconnectably coupling the driven carriage to the self-driven carriage, said driven carriage having magnetic rollers that roll, by magnetic attraction, in contact with the cylindrical track of the support band and also provided with guide rollers for engaging the guide rail of the support band to suspend the driven carriage from the rail, said driven carriage carrying a wire reel loaded with a roll of electrode wire and a wire feeder for supplying the wire from the reel to the torch.

9. An automatic welding apparatus according to claim 3, wherein said guide rollers have center axes substantially perpendicular to those of said magnetic rollers.

10. An automatic welding apparatus according to claim 3, wherein said pair of steel pipes are provided with spirally wound seams.

* * * * *